United States Patent
Dorris (10) Patent No.: US 11,886,349 B2
(45) Date of Patent: Jan. 30, 2024

(54) REMAP ADDRESS SPACE CONTROLLER

(71) Applicant: NXP USA, Inc., Austin, TX (US)

(72) Inventor: Roderick Lee Dorris, Dripping Springs, TX (US)

(73) Assignee: NXP USA, Inc, Austin, TX (US)

( * ) Notice: Subject to any disclaimer, the term of this patent is extended or adjusted under 35 U.S.C. 154(b) by 208 days.

(21) Appl. No.: 16/856,210

(22) Filed: Apr. 23, 2020

(65) Prior Publication Data

US 2021/0334213 A1    Oct. 28, 2021

(51) Int. Cl.
| | |
|---|---|
| G06F 12/00 | (2006.01) |
| G06F 12/0873 | (2016.01) |
| G06F 9/30 | (2018.01) |
| G06F 9/46 | (2006.01) |
| G06F 12/0831 | (2016.01) |
| G06F 12/0846 | (2016.01) |
| G06F 12/14 | (2006.01) |

(52) U.S. Cl.
CPC ...... *G06F 12/0873* (2013.01); *G06F 9/30101* (2013.01); *G06F 9/467* (2013.01); *G06F 12/0831* (2013.01); *G06F 12/0848* (2013.01); *G06F 12/1441* (2013.01); *G06F 2212/7201* (2013.01)

(58) Field of Classification Search
CPC ............. G06F 12/0873; G06F 12/0848; G06F 12/0831; G06F 9/467; G06F 9/30101; G06F 12/1441; G06F 2212/7201
See application file for complete search history.

(56) References Cited

U.S. PATENT DOCUMENTS

| | | | |
|---|---|---|---|
| 9,213,866 B1 | 12/2015 | Ahmad et al. | |
| 9,984,009 B2 | 5/2018 | Ahmed et al. | |
| 10,108,800 B1 | 10/2018 | Surdu | |
| 2015/0356029 A1 | 12/2015 | Craske et al. | |
| 2018/0203638 A1* | 7/2018 | Krueger | G06F 12/1045 |
| 2021/0073125 A1* | 3/2021 | Duluk, Jr. | G06F 12/0646 |

OTHER PUBLICATIONS

Arm, "Arm® CoreLink™ TZC-400 TrustZone® Address Space Controller," Revision r0p1, Technical Reference Manual, 2013-2014, 76 pages.
Arm, "Arm® System Memory Management Unit Architecture Specification," SMMU Architecture Version 2.0, 2012, 2013, 2015, 2016, 372 pages.
Arm, "Arm® 8-M Architecture," Reference Manual, 2015-2017, pp. B8-177-184.
Waterman, A., et al., "The RISC-V Instruction Set Manual," vol. II: Privileged Architecture, CS Division, EECS Department, University of California, Berkeley, May 7, 2017, 91 pages.

* cited by examiner

*Primary Examiner* — Arvind Talukdar (57) ABSTRACT

A Remap Address Space Controller controls access to an address space by selectively remapping a physical address of a transaction received from a controller to form a remapped physical address according to a current execution context of the controller. The selective remapping is based on a determination of whether the current execution context of the controller allows the transaction to access the address space. Remap Address Space Controller selectively provides the transaction with the remapped physical address to a memory bus based on the determination of whether the current execution context of the controller allows the transaction to access the address space.

20 Claims, 9 Drawing Sheets

REMAP ADDRESS SPACE CONTROLLER

BACKGROUND

Field of the Invention

The invention is related to processing systems and more particularly to accesses to an address space of a processing system.

Description of the Related Art

In general, an N-partition execution model isolates execution of program partitions during run time and may support different vendors and data in each partition. Typically, vendors do not share high-level program code, but rather provide only binary program images that result from the compiling or assembling the high-level program code into machine code. A conventional memory management system cannot support an N-partition execution model using address space controllers that are based on finite resources (e.g., stream identifiers or device identifiers) because the number of supported stream identifiers or device identifiers limits the number of partitions that can be supported by the system. To reduce the cost of a System-on-a-Chip (SoC) for a target application, microcontrollers are as small as possible and may not include a memory management unit (MMU). In systems that do not include an MMU, the binary program image must fit accesses to an address space within a physical address space because microcontroller operating systems or real-time operating systems (RTOS) typically do not support position-independent code or virtual memory systems that could be used to extend the physical address space or virtualization of shared peripherals. Accordingly, improved techniques for implementing an N-partition execution system in a SoC using a microcontroller operating system or RTOS are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A Remap Address Space Controller (RASC) is a programmable context-based address space controller that supports an N-partition execution environment including a single core controller (e.g., single core processing unit) in the absence of a hypervisor or memory management unit resident in the controller. The RASC controls access to the physical address space by the controller during execution of isolated partitions. Each partition is associated with different execution code (e.g., code provided by different vendors) that executes in isolation from other execution code of other partitions. The RASC remaps addresses of memory bus transactions (e.g., read from memory, write to memory, write to a memory-mapped peripheral, read from a memory-mapped peripheral, fetch instructions from execute-only memory regions, writes of graphics data to memory-mapped buffers, etc.) that are allowed to access the address space to remapped addresses within the physical address space for microcontroller operating environments or RTOSs that do not support position-independent code. In addition to isolation functions, the remap capability supports virtualization of shared peripherals in the absence of a resident hypervisor and accesses to physical memory regions beyond normal addressability of the controller.

The controller implements context-based execution, which extends back to compile time and increases isolation of executing partitions as compared to using finite resources such as stream or device identifiers. To extend the isolation back into compile time, physical address remap capability is included in the context-based address space controller. An exemplary N-partition execution system includes a corresponding RASC for each bus master in the N-partition execution system. In at least one embodiment of an N-partition execution system, each embodiment of a RASC is sized according to the maximum number of disparate memory regions that can be accessed by the corresponding bus master in an execution context (i.e., partition).

In at least one embodiment, the RASC provides access to the physical address space for transactions that are allowed by a current execution context of the corresponding controller. The transactions that the RASC grants access to the physical address space are defined by Region Registers (e.g., Region Control Registers and Remap Registers), which define a memory region, a type of access allowed, and a remap address. The RASC remaps addresses of transactions that are granted access to the physical address space. Thus, Region Registers have sizes based on the physical address size. The RASC initially blocks accesses by the controller to the address space by default. The RASC Region Registers are reprogrammed in response to a switch of a current execution context of the controller from a default state or first context of a first partition executed by the controller to a second context of a second partition being executed by the controller. Exemplary Region Registers are programmed with address/memory regions, access types, and remap addresses allowed for the current execution context. The RASC corresponding to a bus master is sized according to specifications for that bus master. For example, a RASC corresponding to a CPU will support more concurrent regions in the address space than another RASC corresponding to a Direct Memory Access (DMA) controller. In at least one embodiment, in response to an incoming transaction from a corresponding controller, the RASC compares the address of the incoming transaction to contents of the Region Registers in parallel, thereby reducing the latency that the RASC adds to each transaction. Any region of the physical address space defined for access by an execution context can be remapped within the physical address space, thus allowing an SoC to use a physical address space that is larger than the physical address space that is directly addressable by the controller. The RASC virtualizes accesses to a physical address space corresponding to a memory-mapped peripheral (e.g., the RASC remaps the physical address of the transaction to a virtual driver space) without use of an MMU. In embodiments that have a remapped address that is identical to the input address, the remap capability can be bypassed for that region entry to reduce latency in the RASC.

Figure 1:
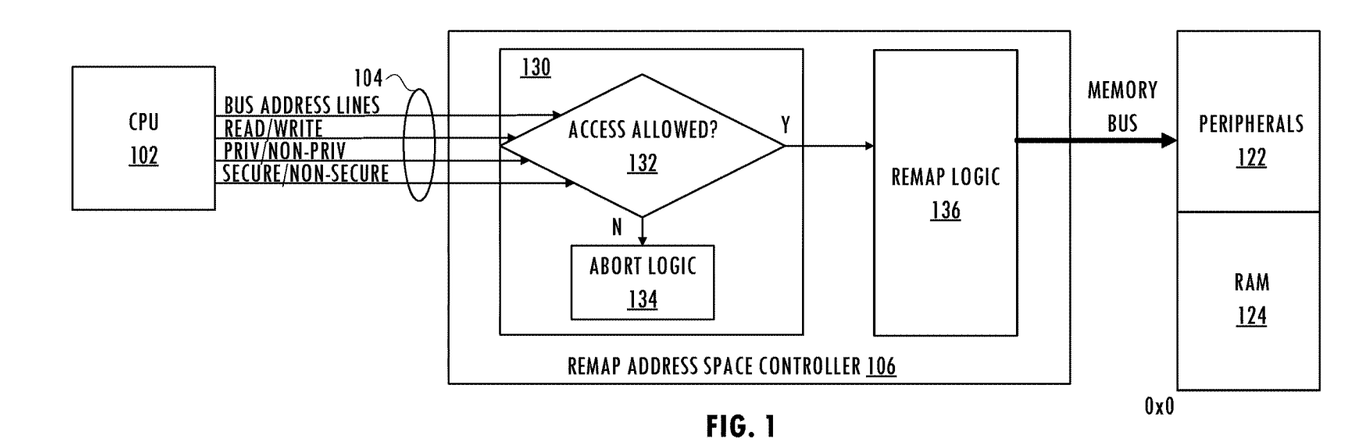
FIG. 1 illustrates a functional block diagram of an exemplary N-partition execution system consistent with at least one embodiment of the invention.

Referring to FIG. 1, in an exemplary N-partition execution system, RASC 106 is coupled between central processing unit 102 and a memory bus (e.g., a bus including instruction and data busses for accessing a physical address space). RASC 106 includes control logic 130 and remap logic 136 that are configured according to a current execution context of central processing unit 102. RASC 106 controls access of central processing unit 102 to regions in the physical address space. Central processing unit 102 or a conventional memory management mechanism (e.g., an MMU or memory processing unit) for filtering or modifying the physical addresses received from central processing unit 102 provides inputs 104 (e.g., address, read/write, privileged/non-privileged, secure/non-secure signals) to RASC 106. RASC 106 operates on the physical addresses received from central processing unit 102 on the bus address lines. RASC 106 uses the physical address and other signals (e.g., signals indicating whether the transaction is privileged or secure and signals indicating whether the transaction is a read, a write, or an execute transaction) to determine whether the associated transaction is allowed to access the physical address space for peripherals 122 and Random Access Memory (RAM) 124 by the current execution context of central processing unit 102. In at least one embodiment, RASC 106 is coupled to another type of bus master (e.g., a DMA controller, a peripheral with a built-in DMA channel, a Graphics Processing Unit (GPU), or a Joint Test Action Group (JTAG) DMA controller) instead of being coupled to central processing unit 102, and RASC 106 controls access to the address space by that bus master. RASC 106 is programmed statically for each execution context (i.e., each partition). That is, RASC 106 is only reprogrammed in response to a switch of a current execution context of the bus master to another execution context and is not dynamically reprogrammed during execution of program code associated with the current execution context. Therefore, caching does not interfere with the RASC support of the N-partition execution environment. For example, in response to a miss in a cache of central processing unit 102, the address of an associated transaction is sent external to central processing unit 102 and RASC 106 controls access by the transaction to the address space. In response to a hit in the cache of central processing unit 102, the address of the transaction does not appear on the buses external to central processing unit 102, and central processing unit 102 accesses instructions or data that was previously provided by RASC 106 in response to a prior cache miss.

Figure 2:
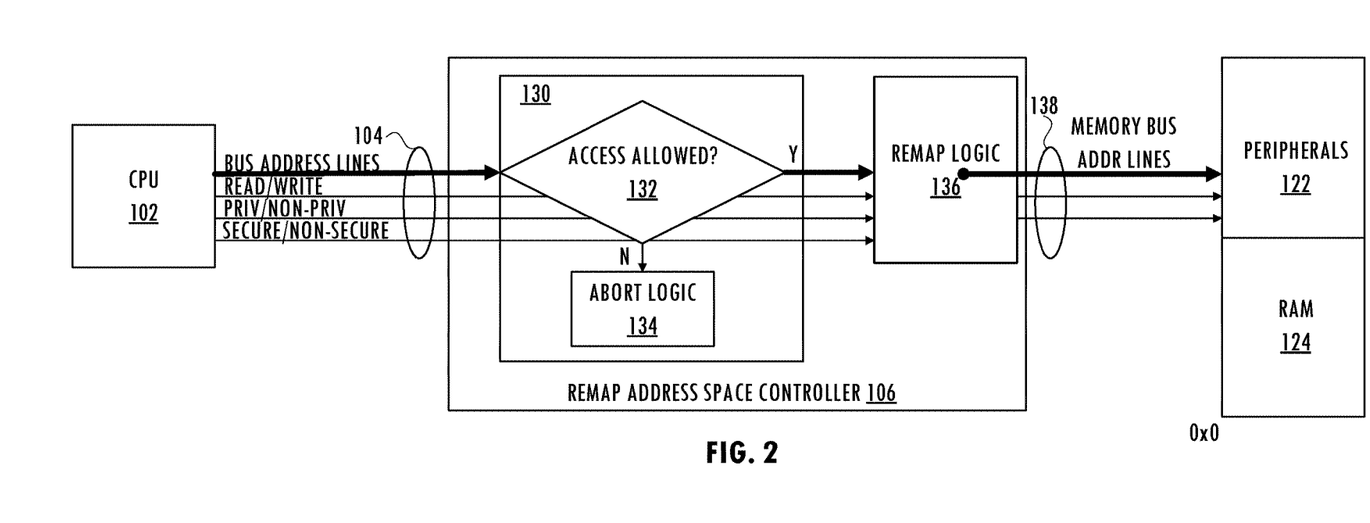
FIG. 2 illustrates a functional block diagram of the N-partition execution system of FIG. 1 allowing access to a physical address space access consistent with at least one embodiment of the invention.
Figure 3:
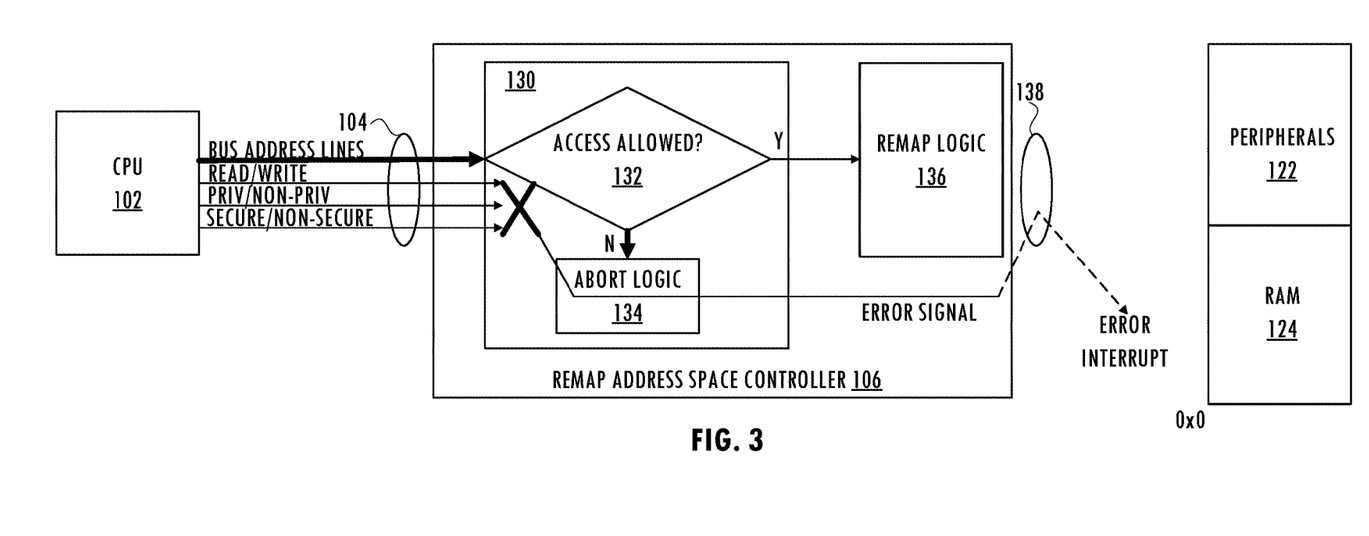
FIG. 3 illustrates a functional block diagram of the N-partition execution system of FIG. 1 aborting an exemplary transaction consistent with at least one embodiment of the invention.
Figure 4:
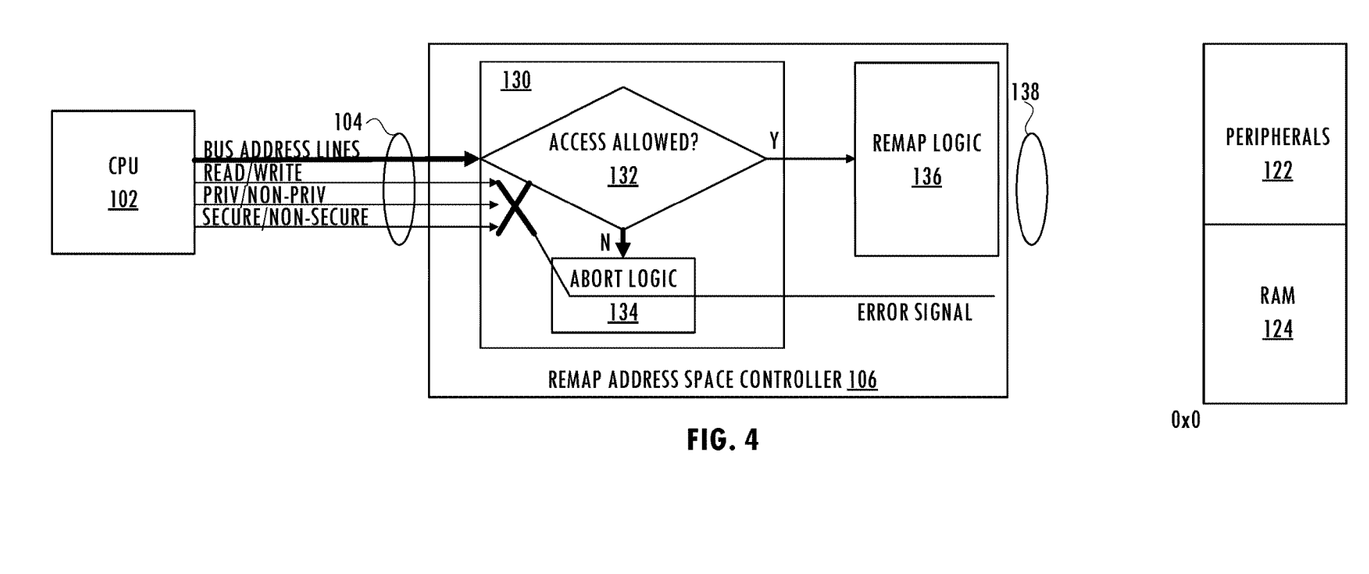
FIG. 4 illustrates a functional block diagram of the N-partition execution system of FIG. 1 emerging from a reset state consistent with at least one embodiment of the invention.

Referring to FIG. 2, if comparison logic 132 determines that a transaction is allowed to access the physical address space, and remap logic 136 is not bypassed for this region, then remap logic 136 remaps the physical address received in inputs 104 into the physical address space and provides the remapped address to the memory bus address lines of outputs 138. RASC 106 passes, unchanged, other signals of the transaction on inputs 104 to outputs 138. In at least one embodiment, if comparison logic 132 determines that the transaction is not allowed to access the physical address space (FIG. 3), then RASC 106 aborts the transaction and abort logic 134 sets an error signal. In another embodiment, if comparison logic 132 determines that the transaction is not allowed to access the physical address space, abort logic 134 generates an error interrupt that is fed back to central processing unit 102 or provided to another controller. In at least one embodiment (FIG. 4), in response to a system reset, RASC 106 blocks all transactions generated by central processing unit 102 from accessing the physical address space by clearing a valid bit for each region in the Level Control Register. Accordingly, central processing unit 102 cannot process a transaction until the Region Registers have been programmed for the appropriate context and the valid bits in the Level Control Register are set.

Figure 5:
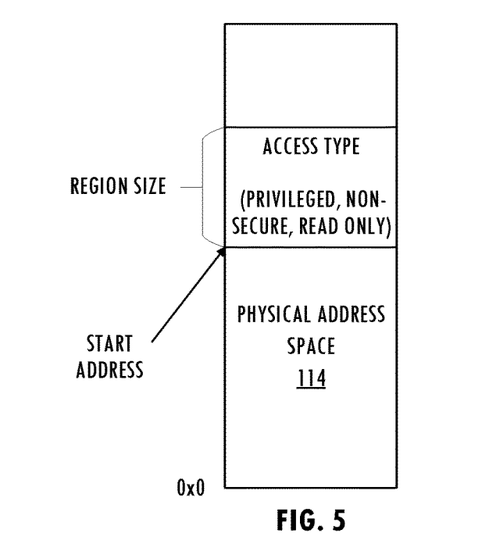
FIG. 5 illustrates an exemplary physical address space of the N-partition execution system of FIG. 1 consistent with at least one embodiment of the invention.
Figure 6:
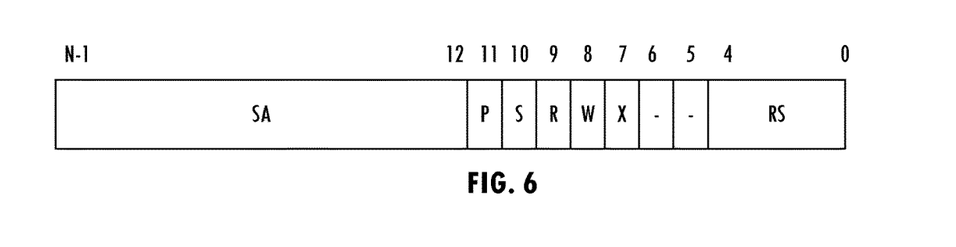
FIG. 6 illustrates an exemplary Region Control Register of a Remap Address Space Controller consistent with at least one embodiment of the invention.

Referring to FIG. 5, in at least one embodiment, a RASC operates on regions of physical address space 114. Each region is defined by a start address, a region size (e.g., in bytes), and a type of access that is allowed on that region according to the current execution context of a corresponding controller. Each region is defined by a corresponding Region Control Register. The width of the Region Control Register depends on the width of the physical address space (e.g., has a width of N bits, where N is the maximum number of bits of the physical address). FIG. 6 illustrates an exemplary Region Control Register including control bits described below in Table 1. Exemplary region size encodings for bits [4:0] of the Region Control Register are described below in Table 2.

TABLE 1

Region Control Register

| Bits | Name | Reset Value | Type | Description |
|---|---|---|---|---|
| N − 1:12 | SA | X | R/W | Start address (a 4 KB-aligned physical address) |
| 11 | P | X | R/W | Privilege: 0 = unprivileged access; 1 = privileged access |
| 10 | S | X | R/W | Secure: 0 = non-secure access; 1 = secure access |
| 9 | R | X | R/W | Read: 0 = read access not allowed; 1 = read access allowed |
| 8 | W | X | R/W | Write: 0 = write access not allowed; 1 = write access allowed |
| 7 | X | X | R/W | Execute: 0 = execute access not allowed; 1 = execute access allowed |
| 6 | — | X | R/W | Reserved: read as zero; writes ignored |
| 5 | — | X | R/W | Reserved: read as zero; writes ignored |
| 4:0 | RS | XXXXX | R/W | Region Size: encoded per Table 2 |

TABLE 2

Region Size (bits [4:0]) encodings of the Region Control Register

| bits[4:0] | Region Size |
|---|---|
| 'b00000 | 4 KB |
| 'b00001 | 8 KB |
| 'b00010 | 16 KB |
| 'b00011 | 32 KB |
| 'b00100 | 64 KB |
| 'b00101 | 128 KB |
| 'b00110 | 256 KB |
| 'b00111 | 512 KB |
| 'b01000 | 1024 KB |
| 'b01001 | 2 MB |
| 'b01010 | 4 MB |
| 'b01011 | 8 MB |
| 'b01100 | 16 MB |
| 'b01101 | 32 MB |
| 'b01110 | 64 MB |
| 'b01111 | 128 MB |
| 'b10000 | 256 MB |

TABLE 2-continued

Region Size (bits [4:0]) encodings of the Region Control Register

| bits[4:0] | Region Size |
|---|---|
| 'b10001 | 512 MB |
| 'b10010 | 1024 MB |
| other values reserved | — |

Figure 7:
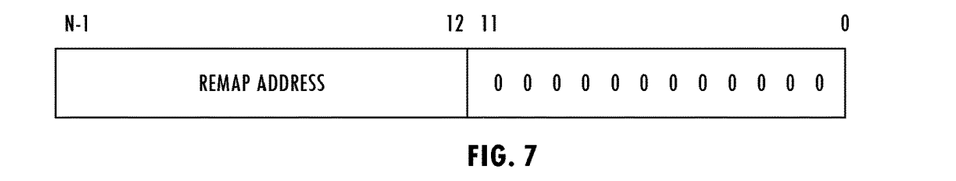
FIG. 7 illustrates an exemplary Region Remap Register of a Remap Address Space Controller consistent with at least one embodiment of the invention.

In at least one embodiment of a RASC, each Region Control Register is associated with a corresponding Region Remap Register. FIG. 7 illustrates an exemplary Region Remap Register that includes control bits described below in Table 3.

TABLE 3

Region Remap Register

| Bits | Name | Reset Value | Type | Description |
|---|---|---|---|---|
| N − 1:12 | Remap Address | X | R/W | Remap Region Start, a 4 KB-aligned physical address |
| 11:0 | — | 0 | R/W | Reserved: read as zero; writes ignored |

Figure 8:
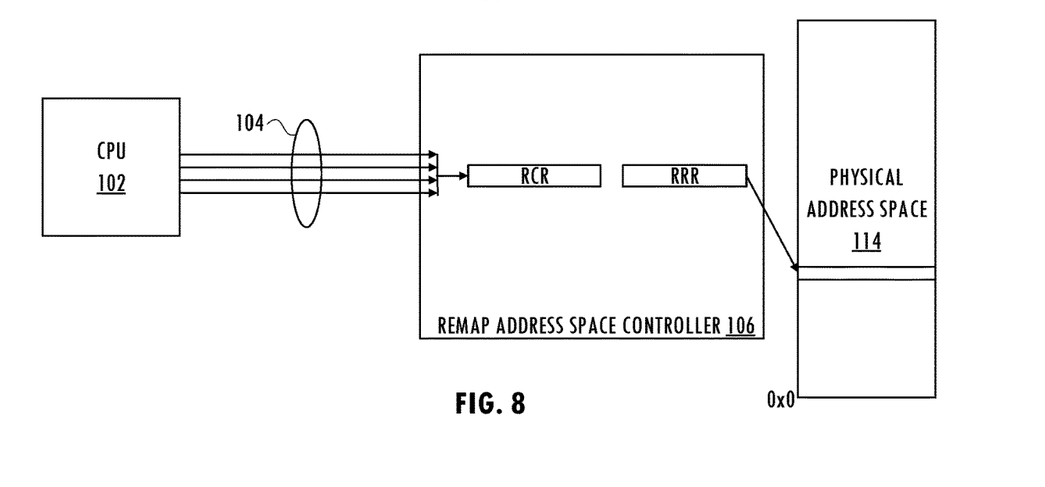
FIG. 8 illustrates a functional block diagram of an N-partition execution system remapping an exemplary address space access consistent with at least one embodiment of the invention.

Referring to FIG. 8, in response to RASC 106 receiving a transaction from central processing unit 102, RASC 106 compares the access type and bus address to corresponding contents of a Region Control Register to determine whether the transaction is allowed to access the physical address space. Therefore, RASC 106 performs a comparison of the bus address of the transaction with the region defined by the Region Control Register as follows:

$$SA \leq BA_i \leq ((SA+(0x1000<<RS))-W_a),$$

where $W_a$ is the access width in bytes, $BA_i$ is the incoming bus address, RS is the region size (e.g., bits [4:0] of the Region Control Register), and SA is the start address (e.g., bits [N−1:12] of the Region Control Register). In addition, the access type signals, which are inputs to RASC 106, are compared to corresponding contents of the Region Control Register. If the incoming bus address of the transaction lies within the range of the region defined by the Region Control Register, and the access types match, then RASC 106 detects a hit, i.e., RASC 106 determines that the transaction is allowed to access the corresponding region of the physical address space. In response to the hit, RASC 106 remaps the input incoming bus address to an output bus address (i.e., a remapped address or a remapped physical address) of the physical address space according to the remap address contents of the Region Remap Register. RASC 106 provides the output bus address to the memory bus for completion of the transaction.

To generate the output bus address ($BA_o$):

$$BA_o=(RA+(BA_i-SA)),$$

where $BA_i$ is the incoming bus address, $BA_o$ is the output bus address, SA is the start address (e.g., bits [N−1:12] of the Region Control Register), and RA is the remap address (e.g., bits [N−1:12] of the Region Remap Register).

Figure 9:
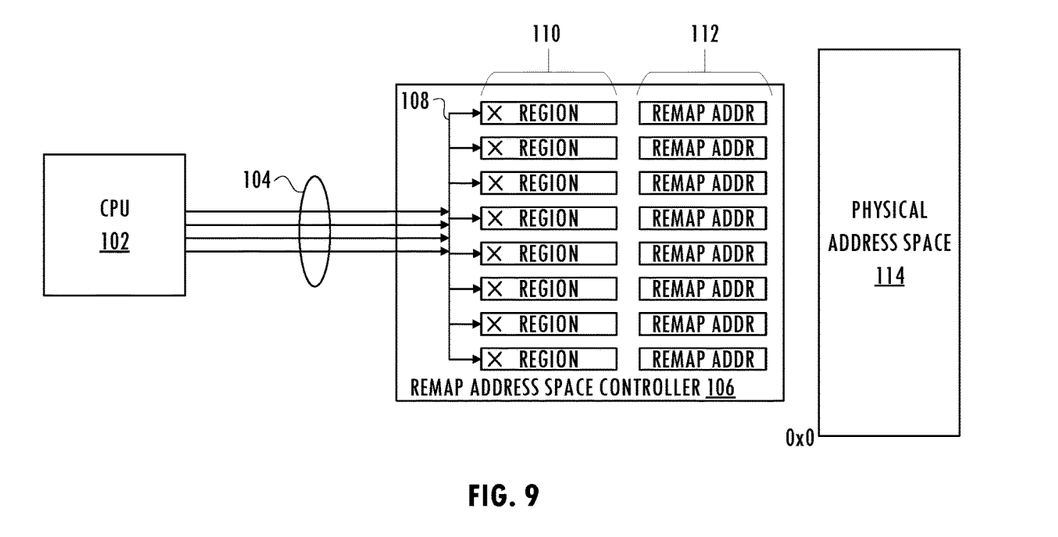
FIG. 9 illustrates a functional block diagram of an N-partition execution system including a Remap Address Space Controller performing a parallel comparison of Region Control Registers to an address of an exemplary transaction consistent with at least one embodiment of the invention.
Figure 10:
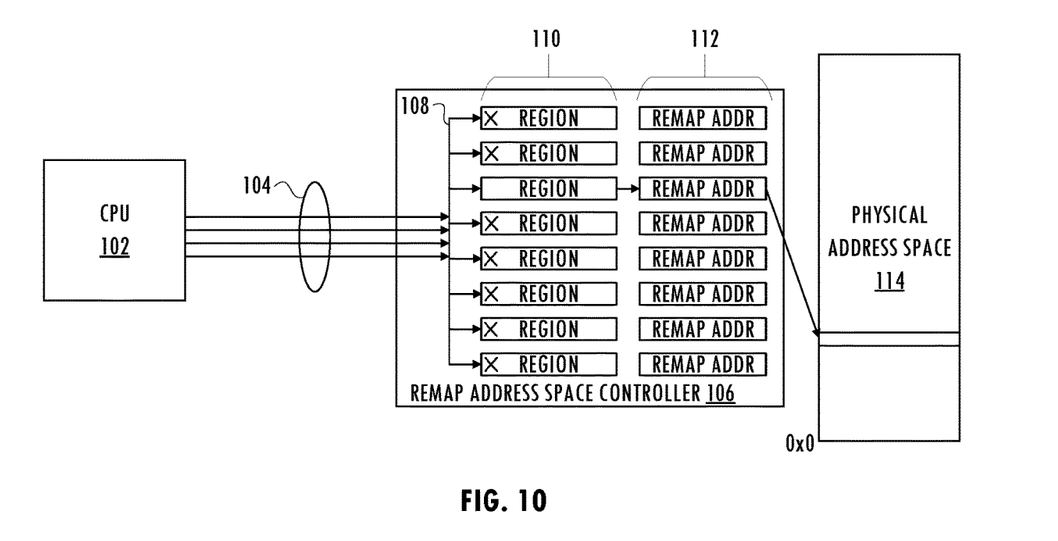
FIG. 10 illustrates a functional block diagram of an N-partition execution system including a Remap Address Space Controller remapping an address of a transaction allowed to access an address space consistent with at least one embodiment of the invention.

In at least one embodiment, RASC 106 includes multiple pairs of Region Control Registers 110 and Region Remap Registers 112. RASC 106 compares information of an incoming transaction to corresponding contents of each of those pairs of registers in parallel, as illustrated in FIGS. 9 and 10. This technique improves performance as compared to performance of serial comparisons of the information in the incoming transaction to corresponding contents of each pair of Region Registers. RASC 106 includes comparison logic 108 that compares the address and access type of the incoming transaction to the corresponding contents each of the pairs of Region Control Registers 110 and Region Remap Registers 112 in parallel. If RASC 106 does not detect a match (FIG. 9), then RASC 106 blocks the transaction from accessing physical address space 114. In addition, RASC 106 blocks all accesses to physical address space 114 coming out of reset. If RASC 106 detects a match of address and access type of the transaction to the corresponding contents of one of the Region Control Registers 110 (FIG. 10) (i.e., RASC 106 detects a hit), then RASC 106 determines that the transaction is allowed to access physical address space 114. In response to detecting a hit, if the remap bypass bit is set, then RASC 106 passes the input bus address to the memory bus as the output bus address, without remapping. If the remap bypass bit is clear, then remap logic 136 remaps the input bus address to an output bus address using the remap address in the Region Remap Register. RASC 106 puts the remapped address on the memory bus for completion of the transaction.

Figure 11:
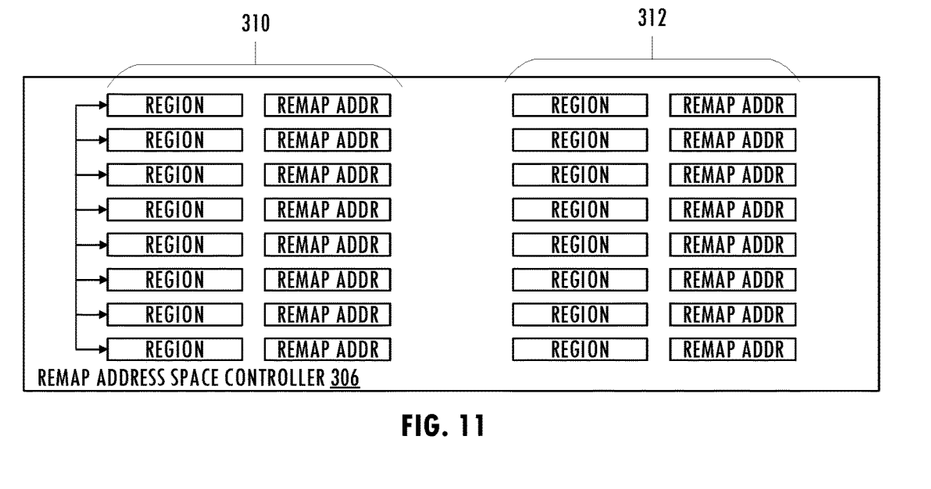
FIG. 11 illustrates a functional block diagram of a hierarchical Remap Address Space Controller performing parallel comparisons of contents a first level of Region Control Registers to an address of an exemplary transaction consistent with at least one embodiment of the invention.
Figure 12:
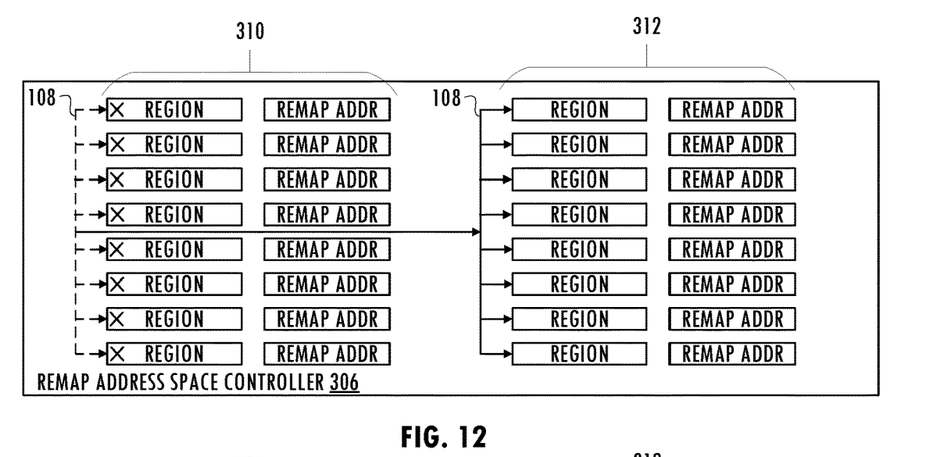
FIG. 12 illustrates a functional block diagram of a hierarchical Remap Address Space Controller performing parallel comparisons of contents of a second level of Region Control Registers to an address of an exemplary transaction consistent with at least one embodiment of the invention.
Figure 13:
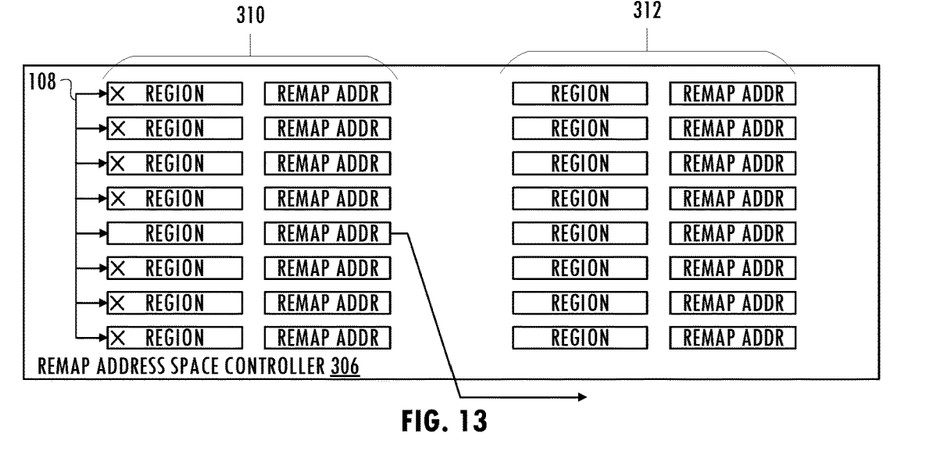
FIG. 13 illustrates a functional block diagram of a hierarchical Remap Address Space Controller remapping an address of an exemplary address space access in response to a hit in a first level of Region Control Registers consistent with at least one embodiment of the invention.
Figure 14:
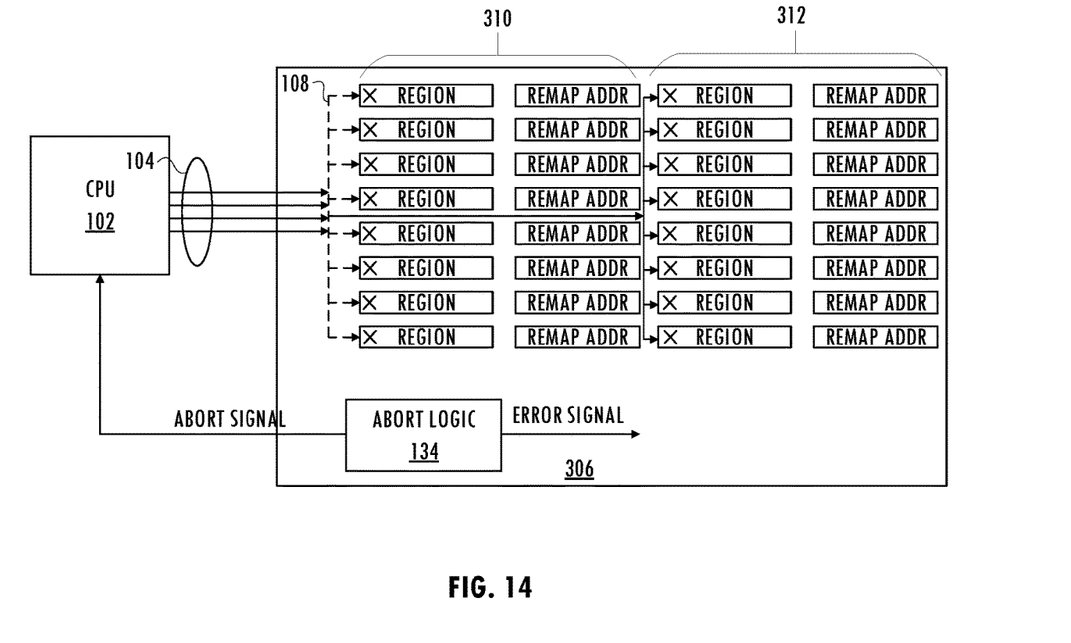
FIG. 14 illustrates a functional block diagram of a hierarchical Remap Address Space Controller aborting an exemplary transaction in response to a miss in the Region Control Registers consistent with at least one embodiment of the invention.

Although FIGS. 9 and 10 illustrate eight pairs of Region Registers for an exemplary eight regions of physical address space 114, a RASC may compare any number of Region Registers in parallel to received information in a transaction. Some bus masters (e.g., central processing units) require more regions per execution context. In at least one embodiment, the RASC searches the Region Registers in parallel up to the maximum that is efficient for a hardware implementation. Accordingly, in at least one embodiment of a RASC, Region Registers are organized hierarchically in as many levels needed to meet system specifications. Referring to FIGS. 11-14, the Region Registers are organized into a hierarchy of two levels of eight Region Resisters each. Contents of the Region Registers in each level are compared in parallel to corresponding information in an incoming transaction. RASC 306 begins the comparison using Region Registers 310 in a first level of the hierarchy (FIG. 11). If RASC 306 does not detect a hit in the first level, then RASC 306 cascades the information for comparison to Region Registers 312 in the second level (FIG. 12), and comparison logic 108 compares the incoming transaction information to corresponding contents of Region Registers 312 in the second level. If RASC 306 does not detect a hit in the second level, then RASC 306 continues parallel comparisons of the incoming transaction to any next levels of the hierarchy in sequence for hierarchies of Region Registers having more than two levels. If RASC 306 detects a hit in any level of the hierarchy, RASC 306 aborts any further comparisons of any additional levels of the hierarchy and remaps the input physical address and puts the remapped address on the memory bus for completion of the transaction. If RASC 306 does not detect a hit in any of the Region Registers in the hierarchy (i.e., transaction misses in RASC 306), then RASC 306 determines that the transaction is not allowed to access the physical address space, aborts the transaction, and generates an error signal. In general, if comparisons of the transaction information to contents of the Region Registers in a first level of the hierarchy takes m clock cycles, then comparisons will take, at most, p×m clock cycles to complete the comparisons for p levels. FIG. 13 illustrates a hit of a transaction in the first level of RASC 306 that outputs a remapped address and aborts comparisons to the contents of Region Registers 312 in the second level. FIG. 14 illustrates a miss of a transaction in Region Registers 310 followed by a miss of the transaction in Region Registers 312. RASC 306 determines that the transaction associated with inputs 104 is not allowed to access the physical address space and abort logic 134 blocks access to physical address space, indicates to central processing unit 102 that the transaction is to be aborted, and generates an error signal.

Figure 15:
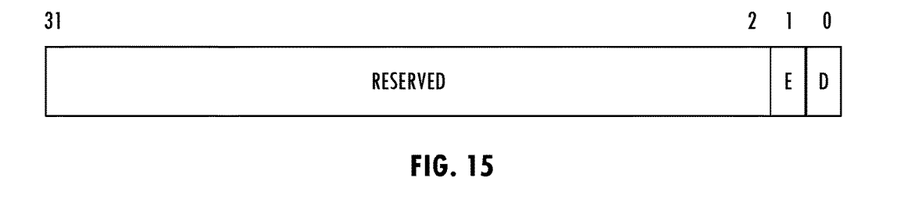
FIG. 15 illustrates an exemplary Global Control and Status Register of a Remap Address Space Controller consistent with at least one embodiment of the invention.

In at least one embodiment, the RASC includes a Global Control and Status Register (FIG. 15) that includes exemplary control and status bits that affect the entire RASC described in Table 4.

TABLE 4

Global Control and Status Register

| Bits | Name | Reset Value | Type | Description |
|---|---|---|---|---|
| 32:1 | — | X | R/W | Reserved, read as 0, writes ignored |
| 1 | E | X | R/W | Error: 0 = valid access; 1 = access blocked. The 'E' bit is set when an invalid access attempt is made. The 'E' bit stays set until it is reset, e.g., by writing a '1' to the 'E' bit; writing a '0' to the 'E' bit has no effect. |
| 0 | D | 0 | R/W | Debug: 0 = debug not enabled; 1 = debug enabled. The 'D' bit is set when the current execution context is under debug. The 'D' bit sets a signal that is used by debug logic external to the RASC |

Figure 16:
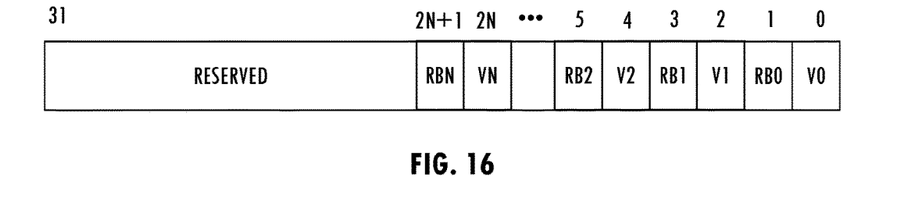
FIG. 16 illustrates an exemplary Level Control Register of a Remap Address Space Controller consistent with at least one embodiment of the invention.

In at least one embodiment, the RASC includes a Level Control Register (FIG. 16) for each level of a hierarchy of Region Registers. The Level Control Register includes a valid bit for each pair of Region Registers (i.e., Region Control Register and Region Remap Register) in the level, and a remap bypass bit for each pair of Region Registers. The Level Control Register indicates which level(s) of a hierarchy of Region Registers in an embodiment of the RASC are valid for the current execution context of a controller and indicates which Region Registers bypass Remap Logic 136 in response to a hit. A system reset clears all valid bits in all Level Control Registers. Table 5 describes an exemplary Level Control Register x.

TABLE 5

Level Control Register x

| Bits | Name | Reset Value | Type | Description |
|---|---|---|---|---|
| 31:2N + 2 | — | X | R/W | Reserved, read as 0, writes ignored |
| 2N + 1 | RBN | | R/W | Remap Bypass bit for Region N of Level x; 0 = remap; 1 = remap bypass |
| 2N | VN | 0 | R/W | Valid bit for Region N of Level x; 0 = not valid; 1 = valid |
| ... | | | | |
| 5 | RB2 | 0 | R/W | Remap Bypass bit for Region 2 of Level x; 0 = remap; 1 = remap bypass |
| 4 | V2 | 0 | R/W | Valid bit for Region 2 of Level x; 0 = not valid; 1 = valid |
| 3 | RB1 | 0 | R/W | Remap Bypass bit for Region 1 of Level x; 0 = remap; 1 = remap bypass |
| 2 | V1 | 0 | R/W | Valid bit for Region 1 of Level x; 0 = not valid; 1 = valid |
| 1 | RB0 | 0 | R/W | Remap Bypass bit for Region 0 of Level x; 0 = remap; 1 = remap bypass |
| 0 | V0 | 0 | R/W | Valid bit for Region 0 of Level x; 0 = not valid; 1 = valid |

Figure 17:
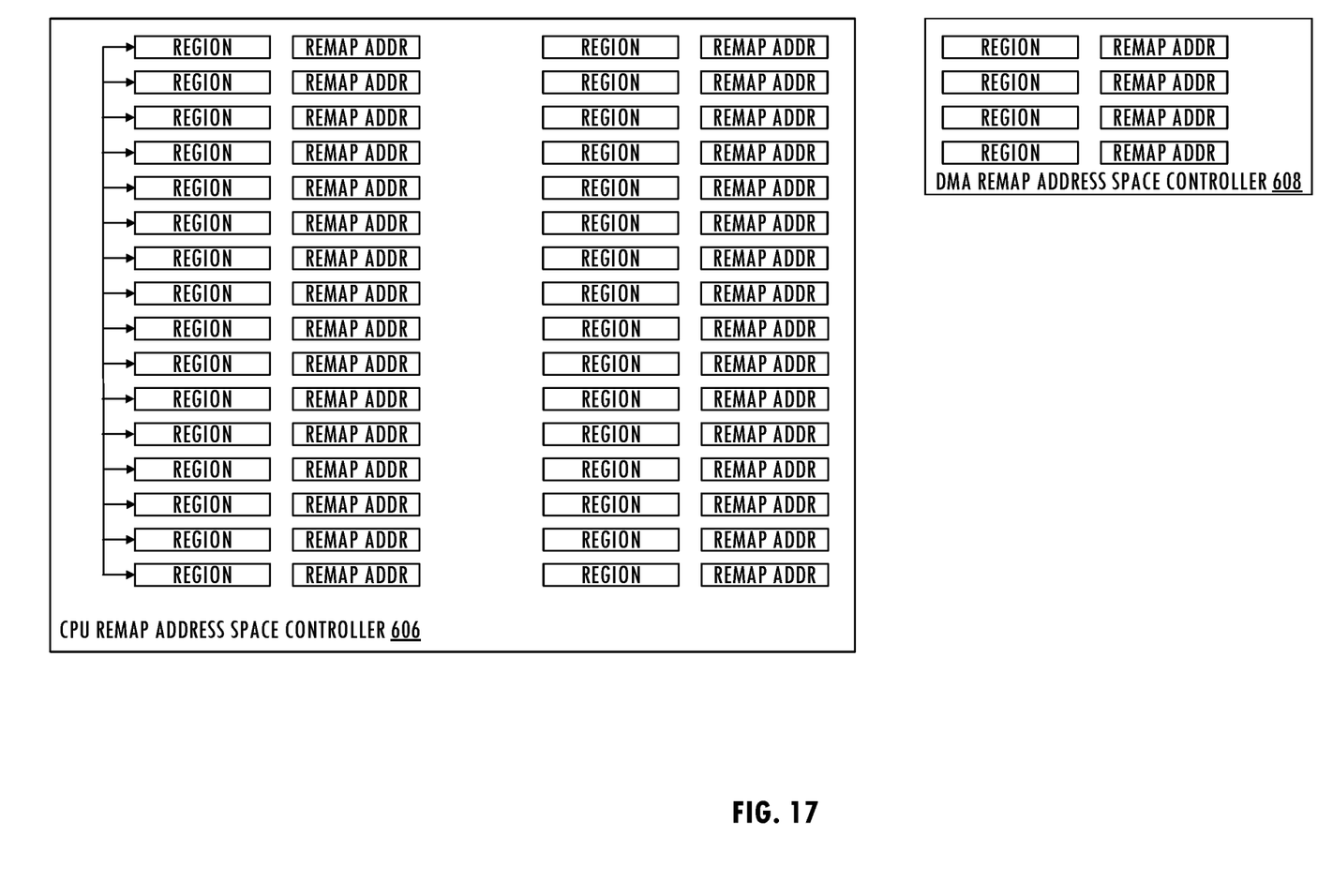
FIG. 17 illustrates functional block diagrams of exemplary embodiments of Remap Address Space Controllers.

FIG. 17 illustrates the scalability of the RASC architecture described herein with exemplary RASC embodiments for different applications. In general, an exemplary DMA controller uses fewer memory regions per context than an exemplary central processing unit. CPU RASC 606 includes two levels of Region Registers for controlling accesses to an address space having up to 32 regions for each context executing on a corresponding central processing unit. DMA RASC 608 includes one level of Region Registers for controlling accesses to an address space having up to four regions for each context executing on a corresponding DMA controller. The RASC architecture can be extended to various SoC architectures having different bus masters with different requirements for the number of regions of the address space that are valid in any corresponding execution context.

Figure 18:
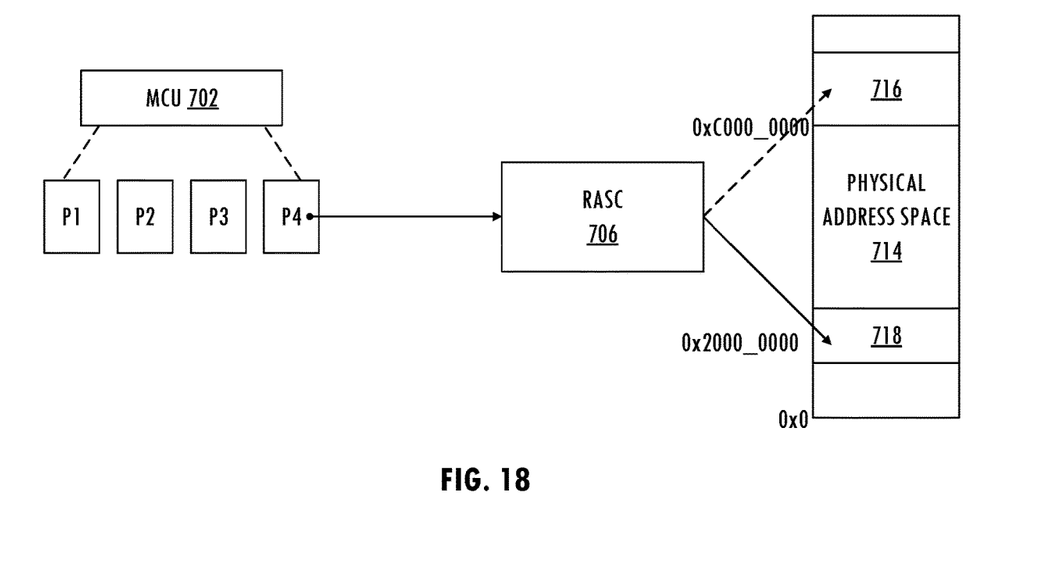
FIG. 18 illustrates a functional block diagram of an exemplary N-partition execution system implementing a virtualized peripheral consistent with at least one embodiment of the invention.

Referring to FIG. 18, in an exemplary embodiment, RASC 706 controls access to physical address space 714 by transactions received from microcontroller unit 702 that is configured to execute code of one partition at a time in a 4-partition execution environment (i.e., four execution contexts). During execution of code in partition P4, microcontroller unit 702 attempts to access a memory-mapped peripheral at address 0xC000_0000 in a virtual address space that corresponds to region 716 of physical address space 714. RASC 706 determines that the transaction is allowed to access physical address space 714 by the context of partition P4 and remaps the physical address from 0xC000_0000 to 0x2000_0000, which corresponds to region 718 of physical address space 714. The transaction appears to partition P4 as a direct access to physical address space 714 although partition P4 accesses the physical address space via a virtual driver of RASC 706. Any partition that shares the peripheral has access to the virtual driver of RASC 706. Thus, RASC 706 virtualizes the peripheral without any control software executing on microcontroller unit 702.

Figure 19:
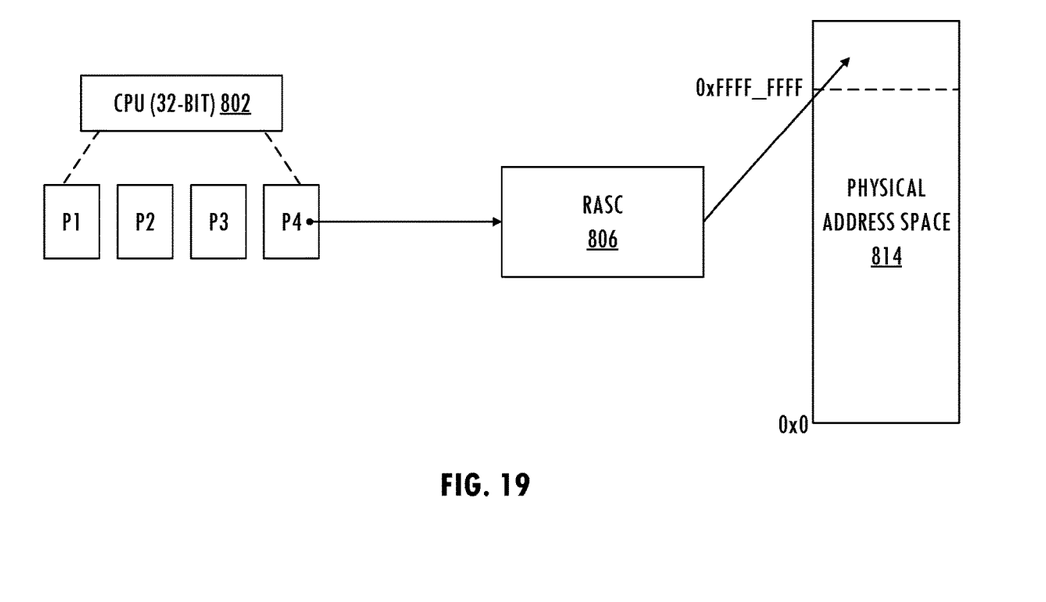
FIG. 19 illustrates a functional block diagram of an exemplary N-partition execution system providing access to a region of physical address space beyond addressing capability of a controller consistent with at least one embodiment of the invention.

Referring to FIG. 19, in an exemplary embodiment, RASC 806 controls accesses to physical address space 814 by transactions received from central processing unit 802 that is a 32-bit central processing unit (i.e., configured for a 32-bit wide address space) and configured to execute code of one partition at a time in a 4-partition execution environment (i.e., four execution contexts). In general, a 32-bit central processing unit cannot directly access a region of the physical address space with addresses above 0xFFFF_FFFF. Since RASC 806 has a width corresponding to the width of physical address space 814, RASC 806 can access all of the physical address space. RASC 806 remaps addresses received from central processing unit 802 to physical address space 814 and can remap accesses from central processing unit 802 to regions beyond 0xFFFF_FFFF the physical address space 814.

Figure 20:
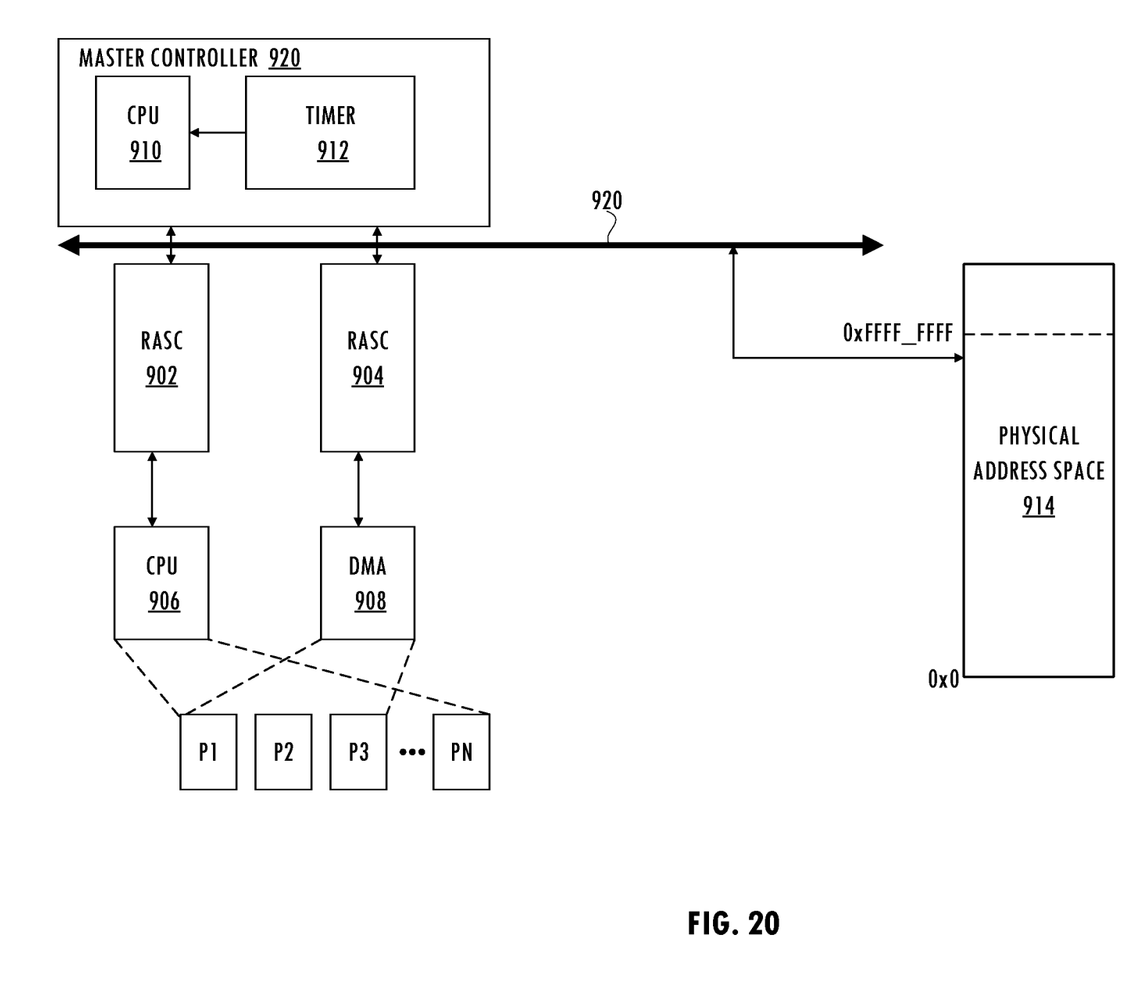
FIG. 20 illustrates a functional block diagram of an exemplary N-partition execution system including a master controller configured to initiate context switches of slave bus masters coupled to corresponding Remap Address Space Controllers consistent with at least one embodiment of the invention.

Referring to FIG. 20, in at least one embodiment, an N-partition execution system includes multiple bus masters. Central processing unit 906 and DMA controller 908 issue transactions that accesses physical address space 914 to memory bus 922 via RASC 902 and RASC 904, respectively. Central processing unit 906 executes N partitions, although DMA controller 908 executes only partitions P1, P2, and P3. In other embodiments, DMA controller 908 or additional bus masters are available to any combination of those N partitions or central processing unit 906 executes only a subset of the N partitions. In at least one embodiment, master controller 920 triggers initializations of slave bus masters (e.g., central processing unit 906 and DMA controller 908) and schedules context switches for those slave bus masters (e.g., according to a conventional round-robin scheduling model). For example, master controller 920 includes central processing unit 910 and timer 912. In response to expiration of a predetermined time slice (i.e., time quanta), as indicated by timer 912, central processing unit 910 triggers (e.g., by causing an interrupt service request) a switch of a current execution context of central processing unit 906 or DMA controller 908 from partition $P_n$ to partition $P_{n+1}$. In at least one embodiment of the N-partition execution system, an indicator received from master controller 920 causes central processing unit 906 and DMA controller 908 to load from memory corresponding binary program images for partition $P_{n+1}$ and causes RASC 902 and RASC 904 to load from memory respective configuration information associated with partition $P_{n+1}$ for loading into corresponding Region Registers. Master controller 920 holds central processing unit 906 and DMA controller 908 in non-execution states until RASC 902 and RASC 904 are programmed for the next execution context. In other embodiments, master controller 920 independently controls RASC 902 and RASC 904.

In at least one embodiment, master controller 920 resets central processing unit 906, DMA controller 908, RASC 902, and RASC 904 in response to a power-on-reset or other system reset. The reset clears the valid bits in the Level Control Register of RASC 902 and RASC 904, thus, there is no access to memory bus 922 or physical address space 914. Master controller 920 causes central processing unit 906 and DMA controller 908 controller to exit a reset state to a current execution context and begin execution after RASC 902 and RASC 904, respectively, have been configured for corresponding next execution contexts.

Thus, techniques for implementing an N-partition execution model are disclosed. The remap capability of the RASC described herein allows a controller to access physical addresses larger than the direct addressing capability of the controller. The techniques described above include virtualizing shared peripherals by remapping accesses to a virtual driver and accessing the peripheral by a RASC. The techniques support an N-partition execution environment on a single core controller in the absence of a hypervisor or memory management unit resident on the controller using a programmable address space controller to isolate partitions during run time.

In at least one embodiment, a method for controlling access to an address space includes selectively remapping a physical address of a transaction received from a controller to form a remapped physical address according to a current execution context of the controller. The selectively remapping is based on a determination of whether the current execution context of the controller allows the transaction to access the address space. The method includes selectively providing the transaction with the remapped physical address to a memory bus based on the determination of whether the current execution context of the controller allows the transaction to access the address space. The method may include executing code of a first partition having the current execution context by the controller, separately in time from executing code of any other partitions of N partitions, N being an integer greater than zero. The method may include configuring a remap address space controller according to the current execution context. The remap address space controller may receive the transaction from the controller. The remap address space controller may perform the selectively remapping and the selectively providing. The configuring may include programming region storage elements with address regions, access types, and remap physical addresses associated with the current execution context.

The method may further include initiating a switch of the current execution context from a first context associated with the first partition being executed by the controller to a second context associated with a second partition of the N partitions, being executed by the controller. The initiating may be by a master controller. The method may further include executing code of a second partition by the controller, separately in time from executing code of any other partitions of the N partitions. The method may further include reconfiguring the remap address space controller in response to a switch of the current execution context from a first context associated with the first partition being executed by the controller to the second context associated with a second partition being executed by the controller. The method may further include determining whether the current execution context allows the transaction to access the address space. The determining may include comparing in parallel each address region defined by each of a plurality of region control registers to the physical address of the transaction. The determining may include comparing in parallel each address region defined by each region control register of a level of a plurality of hierarchically organized region control registers to the physical address of the transaction.

The method may further include, in response to the transaction being allowed to access to the address space: generating the remapped physical address according to the current execution context; and outputting the remapped physical address to an address bus of the memory bus. The method may further include, aborting the transaction in response to the transaction not being allowed to access the address space. The method may further include, initializing a remap address space controller in a state not allowed to access the address space.

In at least one embodiment, an N-partition execution system includes a remap address space controller. The remap address space controller includes comparison logic configured to determine whether a current execution context of a controller allows a transaction received from the controller to access an address space. The remap address space controller includes remap logic configured to selectively remap a physical address of the transaction to form a remapped physical address according to the current execution context based on a determination by the comparison logic of whether the current execution context allows the transaction to access the address space. The an N-partition execution system may further include the controller configured to execute code of a first partition having the current execution context separately in time from executing code of any other partitions of N partitions, N being an integer greater than zero. The remap address space controller may be further configured to selectively provide the transaction with the remapped physical address to a memory bus based on the determination by the comparison logic of whether the current execution context allows the transaction to access the address space.

The comparison logic may include a region control register configured to store an identification of an address region and a type of access allowable for the address region in the current execution context. Contents of the plurality of region control registers may be compared to the physical address in parallel. The region control register may be one of a plurality of region control registers. The plurality of region control registers may be organized in a hierarchy. The contents of region control registers in each level of the hierarchy may be compared to the physical address in parallel.

The remap address space controller may further include a global control and status register configured to store an error indicator. The remap address space controller may be configured to selectively set the error indicator based on the determination. The N-partition execution system may further include the controller configured to generate the transaction and a memory bus of the address space. The remap address space controller may be coupled between the controller and the memory bus. The N-partition execution system may further include a master controller coupled to the memory bus and configured to: initialize the remap address space controller in a state not allowed access to the address space; configure the remap address space controller in response to a switch of the current execution context from an initial state to a first context associated with executing a first task; and reconfigure the remap address space controller in response to another switch of the current execution context from the first context to a second context associated with executing a second task. The remap address space controller may further include abort logic configured to selectively abort the transaction based on the determination by the comparison logic of whether the current execution context allows the transaction to access the address space.

In at least one embodiment, a system includes a memory bus and a controller configured to execute code of a partition having a current execution context, separately in time from code of any other partitions of N partitions. N is an integer greater than zero. The system includes a remap address space controller configured to operate according to the current execution context and to selectively provide accesses from the controller to the memory bus with bus addresses remapped according to the current execution context.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for controlling access to an address space by a remap address space controller (RASC), the method comprising:
   selectively remapping by the RASC a physical address of a transaction received from a bus master external to the RASC to form a remapped physical address according to a current execution context of the bus master, the selectively remapping being based on a determination of whether the current execution context of the bus master allows the transaction to access the address space, wherein determining whether the current execution context of the bus master allows the transaction to access the address space comprises: comparing by the RASC an access type of the transaction to access types which are allowed by the current execution context to the address space;
   and selectively providing by the RASC the transaction with the remapped physical address to a memory bus based on the determination of whether the current execution context of the bus master allows the transaction to access the address space.

2. The method, as recited in claim 1, further comprising: executing code of a first partition having the current execution context by the bus master, separately in time from executing code of any other partitions of N partitions, N being an integer greater than zero; and configuring the RASC according to the current execution context, wherein the RASC receives the transaction from the controller bus master and performs the selectively remapping and the selectively providing.

3. The method, as recited in claim 2, wherein the configuring comprises:
programming region storage elements with address regions, access types, and remap physical addresses associated with the current execution context.

4. The method, as recited in claim 2, further comprising: initiating a switch of the current execution context from a first context associated with the first partition being executed by the bus master, to a second context associated with a second partition of the N partitions being executed by the bus master, the initiating being by a master controller.

5. The method, as recited in claim 2, further comprising: executing code of a second partition by the bus master, separately in time from executing code of any other partitions of the N partitions; and reconfiguring the RASC in response to a switch of the current execution context from a first context associated with the first partition being executed by the bus master to a second context associated with the second partition.

6. The method, as recited in claim 1, further comprising: determining whether the current execution context allows the transaction to access the address space, the determining comprising:
comparing in parallel each address region defined by each of a plurality of region control registers to the physical address of the transaction.

7. The method, as recited in claim 1, further comprising: determining whether the current execution context allows the transaction to access the address space, the determining comprising:
comparing in parallel each address region defined by each region control register of a level of a plurality of hierarchically organized region control registers to the physical address of the transaction.

8. The method, as recited in claim 1, further comprising: in response to the transaction being allowed to access to the address space:
generating the remapped physical address according to the current execution context; and
outputting the remapped physical address to an address bus of the memory bus.

9. The method, as recited in claim 1, further comprising: aborting the transaction in response to the transaction not being allowed to access the address space.

10. The method, as recited in claim 1, further comprising: initializing the RASC in a state not allowed to access the address space.

11. An N-partition execution system comprising: a remap address space controller (RASC) comprising: comparison logic configured to determine by the RASC whether a current execution context of a bus master external to the RASC allows a transaction received from the bus master to access an address space, wherein the comparison logic is configured to compare by the RASC an access type of the transaction to access types which are allowed by the current execution context to the address space; and remap logic configured by the RASC to selectively remap a physical address of the transaction to form a remapped physical address according to the current execution context based on a determination by the comparison logic of whether the current execution context allows the transaction to access the address space.

12. The N-partition execution system, as recited in claim 11, further comprising: the bus master configured to execute code of a first partition having the current execution context separately in time from executing code of any other partitions of N partitions, N being an integer greater than zero, wherein the RASC is further configured to selectively provide the transaction with the remapped physical address to a memory bus based on the determination by the comparison logic of whether the current execution context allows the transaction to access the address space.

13. The N-partition execution system, as recited in claim 11, wherein the comparison logic comprises:
a region control register configured to store an identification of an address region and a type of access allowable for the address region in the current execution context.

14. The N-partition execution system, as recited in claim 13, wherein the region control register is one of a plurality of region control registers, contents of the plurality of region control registers being compared to the physical address in parallel.

15. The N-partition execution system, as recited in claim 13, wherein the region control register is one of a plurality of region control registers, the plurality of region control registers being organized in a hierarchy, contents of region control registers in each level of the hierarchy being compared to the physical address in parallel.

16. The N-partition execution system, as recited in claim 11, wherein the RASC further comprises: a global control and status register configured to store an error indicator, wherein the RASC is configured to selectively set the error indicator based on the determination.

17. The N-partition execution system, as recited in claim 11, further comprising: the bus master configured to generate the transaction; and a memory bus of the address space, wherein the RASC is coupled between the bus master and the memory bus.

18. The N-partition execution system, as recited in claim 17, further comprising: a master controller coupled to the memory bus and configured to: initialize the RASC in a state not allowed access to the address space; configure the RASC in response to a switch of the current execution context from an initial state to a first context associated with executing a first task; and reconfigure the RASC in response to another switch of the current execution context from the first context to a second context associated with executing a second task.

19. The N-partition execution system, as recited in claim 11, wherein the RASC further comprises: abort logic configured to selectively abort the transaction based on the determination by the comparison logic of whether the current execution context allows the transaction to access the address space.

20. A system comprising:
a memory bus;
a bus master configured to execute code of a partition having a current execution context separately in time from code of any other partitions of N partitions, N being an integer greater than zero;
and a remap address space controller (RASC) configured to operate according to the current execution context and to selectively provide accesses from the bus master to the memory bus with bus addresses remapped from a physical address received by the RASC to a remapped physical address according to the current execution context, wherein the bus master is external to the RASC.

\* \* \* \* \*